(12) United States Patent
Chae

(10) Patent No.: US 9,987,952 B2
(45) Date of Patent: Jun. 5, 2018

(54) SEAT PUMPING DEVICE FOR VEHICLE

(71) Applicant: HYUNDAI DYMOS INCORPORATED, Seosan-si (KR)

(72) Inventor: Soo Young Chae, Yongin-si (KR)

(73) Assignee: Hyundai Dymos Incorporated, Seosan-si (KR)

( * ) Notice: Subject to any disclaimer, the term of this patent is extended or adjusted under 35 U.S.C. 154(b) by 0 days. days.

(21) Appl. No.: 15/446,737

(22) Filed: Mar. 1, 2017

(65) Prior Publication Data

US 2017/0253148 A1    Sep. 7, 2017

(30) Foreign Application Priority Data

Mar. 3, 2016    (KR) ......................... 10-2016-0025844

(51) Int. Cl.
*B60N 2/16*    (2006.01)
*F16D 41/10*    (2006.01)
(Continued)

(52) U.S. Cl.
CPC ........... *B60N 2/1635* (2013.01); *B60N 2/168* (2013.01); *B60N 2/167* (2013.01); *F16D 15/00* (2013.01); *F16D 41/105* (2013.01); *F16D 59/00* (2013.01)

(58) Field of Classification Search
None
See application file for complete search history.

(56) References Cited

U.S. PATENT DOCUMENTS 8,348,344 B2 *  1/2013  Richard ................. B60N 2/167
                                                    297/344.12
2005/0006193 A1    1/2005  Kim
(Continued)

FOREIGN PATENT DOCUMENTS

DE    11 2007 002 311 T5    7/2009
DE    11 2013 005 704 T5    9/2015
(Continued)

OTHER PUBLICATIONS

Korean Office Action for Korean Patent Application No. 10-2016-0025844, dated Mar. 22, 2017, Korean Intellectual Property Office.

*Primary Examiner* — Robert W Hodge
*Assistant Examiner* — Ryan P Dodd
(74) *Attorney, Agent, or Firm* — Baker & McKenzie LLP; Hyunho Park

(57) ABSTRACT

Disclosed is a seat pumping device for a vehicle. The present invention provides a seat pumping device for a vehicle, the seat pumping device including: a clutch device which is rotated clockwise or counterclockwise by receiving external manipulation force, and has one or more manipulation flanges that are disposed at a predetermined interval in a circumferential direction and protrude in an axial direction; and a brake device which has one or more manipulation grooves in which the manipulation flanges are accommodated to come into contact with the manipulation grooves clockwise or counterclockwise so that the brake device is rotated clockwise or counterclockwise by receiving the external manipulation force from the clutch device, and performs a brake function such that the brake device is not rotated clockwise and counterclockwise by external force that is not through the clutch device.

14 Claims, 5 Drawing Sheets

(51) Int. Cl.
 *F16D 59/00* (2006.01)
 *F16D 15/00* (2006.01)

(56) References Cited

U.S. PATENT DOCUMENTS

2007/0137978 A1* 6/2007 Yamada ............... B60N 2/1615
 192/223.2
2015/0367755 A1 12/2015 Lee et al.

FOREIGN PATENT DOCUMENTS

| KR | 10-2005-0007915 A | 1/2005 |
| KR | 10-0722849 B1 | 5/2007 |
| KR | 10-0784620 B1 | 12/2007 |
| KR | 10-1491883 B1 | 2/2015 |

\* cited by examiner

SEAT PUMPING DEVICE FOR VEHICLE

CROSS-REFERENCE TO RELATED APPLICATIONS

This application claims priority to and the benefit of Korean Patent Application No. 10-2016-0025844 filed in the Korean Intellectual Property Office on Mar. 3, 2016, the entire contents of which are incorporated herein by reference.

TECHNICAL FIELD

The present invention relates to a seat pumping device for a vehicle, and more particularly, to a seat pumping device for a vehicle which is light in weight, and has a small size and improved performance.

BACKGROUND ART

A seat pumping device for a vehicle in the related art refers to a device which is attached to a seat in order to allow an occupant seated in the seat to manually adjust a height of a seat cushion in accordance with his/her body type. When the occupant seated in the seat manipulates a lever handle, which is installed at a lateral side of the seat cushion, clockwise or counterclockwise, operating force of the lever handle is transmitted to a link mechanism through the seat pumping device, such that the seat cushion moves upward or downward in response to a direction in which the lever handle is manipulated.

The seat pumping device for a vehicle has been publicly known through Korean Patent Nos. 10-0722849 and 10-0784620, and the seat pumping device for a vehicle includes an input device which is provided with a lever handle installed at a lateral side of a seat cushion and allows a user to manipulate the lever handle to input rotational torque, a clutch device which receives the rotational torque from the input device and transmits the rotational torque, an output device which receives the input torque from the clutch device and transmits the input torque to a link mechanism connected to the seat cushion so as to adjust a height of the seat cushion, a brake device which is rotatably coupled together with the output device, is connected with the clutch device so as to be rotatable by the clutch device, and performs a brake function on external input torque that is not through the clutch device.

More specifically, the clutch device of the seat pumping device disclosed in Korean Patent No. 10-0722849 includes an outer case, a clutch shaft, a clutch spring, a washer, a handle lever bracket, a flat spring, a clutch block, a retainer assembly, and an inner case, and the brake device includes an inner case, a brake block, a brake drum, a roller assembly, a brake shaft, and a cover plate.

In this case, it is necessary to further simplify a structure of the seat pumping device for a vehicle in the related art because the structure is complicated, which causes increases in weight and costs.

SUMMARY OF THE INVENTION

The present invention has been made in an effort to provide a seat pumping device for a vehicle which achieves reduction in weight and costs and improves performance by simplifying structures of a clutch device and a brake device.

An exemplary embodiment of the present invention provides a seat pumping device for a vehicle, the seat pumping device including: a clutch device which is rotated clockwise or counterclockwise by receiving external manipulation force, and has one or more manipulation flanges that are disposed at a predetermined interval in a circumferential direction and protrude in an axial direction; and a brake device which has one or more manipulation grooves in which the manipulation flanges are accommodated to come into contact with the manipulation grooves clockwise or counterclockwise so that the brake device is rotated clockwise or counterclockwise by receiving the external manipulation force from the clutch device, and performs a brake function such that the brake device is not rotated clockwise and counterclockwise by external force that is not through the clutch device.

In an exemplary embodiment, the clutch device may include a ring-shaped clutch drum, and the manipulation flange may be formed to protrude in the axial direction from one rim of a body of the clutch drum.

The manipulation flange may be formed in a block shape.

The manipulation flange may be formed to protrude further inward in a radial direction than an inner circumferential surface of the clutch drum.

In another exemplary embodiment, the brake device may include a brake drum, the brake drum may include: a drum body having an assembly hole that penetrates a center of the drum body so that an output shaft is coupled to the assembly hole; and a flange formed at one side of the drum body, and the manipulation grooves may be disposed in an outer circumferential surface of the drum body at a predetermined interval in the circumferential direction.

Wedge surfaces may be formed at both sides of the manipulation groove of the drum body. The manipulation groove may be formed to be recessed inward in the radial direction from the outer circumferential surface.

A circumferential width of the manipulation groove may be larger than a circumferential width of the manipulation flange.

The flange may be formed to have a circular outer circumferential surface, and the flange may be rotatable by being supported on an inner circumferential surface of a drum housing that accommodates the clutch device and the brake device.

In still another exemplary embodiment, an input member may be accommodated in the clutch drum so as to be rotatable by the external manipulation force, a plurality of clutch rollers may be disposed between an outer circumferential surface of the input member and the inner circumferential surface of the clutch drum, the two clutch rollers, which are adjacent to each other, may be resiliently supported in the circumferential direction by clutch springs, and the clutch drum may rotate together with the input member by a wedging action of the clutch rollers by the rotation of the input member.

The input member may include a member body, and one or more wedge protrusions, which protrude outward in the radial direction and create the wedging action by pressing the clutch rollers, may be formed on the member body.

The one or more wedge protrusions may be disposed at a predetermined interval in the circumferential direction.

A stopper protrusion, which restricts a movement of the clutch roller that does not perform the wedging action, may be formed on the clutch drum.

The seat pumping device for a vehicle according to the present invention may further include a lever bracket which is coupled to a lever handle manipulated clockwise and counterclockwise by an occupant seated in a seat, and rotates together with the lever handle, in which the lever bracket is fastened to the input member so as to be rotated integrally with the input member.

The seat pumping device for a vehicle according to the present invention may further include: a drum housing which accommodates the clutch device and the brake device so that the clutch device and the brake device are rotatable; and a cover plate which is fastened to the drum housing so as to block and cover an opening of the drum housing, in which the brake device includes: a plurality of brake rollers which is interposed between wedge surfaces of the brake drum and an inner circumferential surface of the drum housing, and disposed at a predetermined interval in the circumferential direction; and brake springs which are interposed between the brake rollers adjacent to each other, and resiliently support the brake rollers in the circumferential direction.

When the clutch device rotates, the manipulation flange may release a brake state by pushing the brake roller first, and then transmit rotational force to the brake drum by pushing one side wall surface of the manipulation groove.

According to the seat pumping device for a vehicle according to the exemplary embodiment of the present invention as described above, the clutch device includes the clutch springs, the clutch rollers, and the clutch drum, the brake device includes the brake rollers, the brake springs, and the brake drum, and as a result, the structures of the clutch device and the brake device may be simplified, and the sizes of the clutch device and the brake device may be reduced, thereby achieving the reduction in weight and costs.

The clutch device and the brake device operate smoothly, and as a result, it is possible to improve operational reliability.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
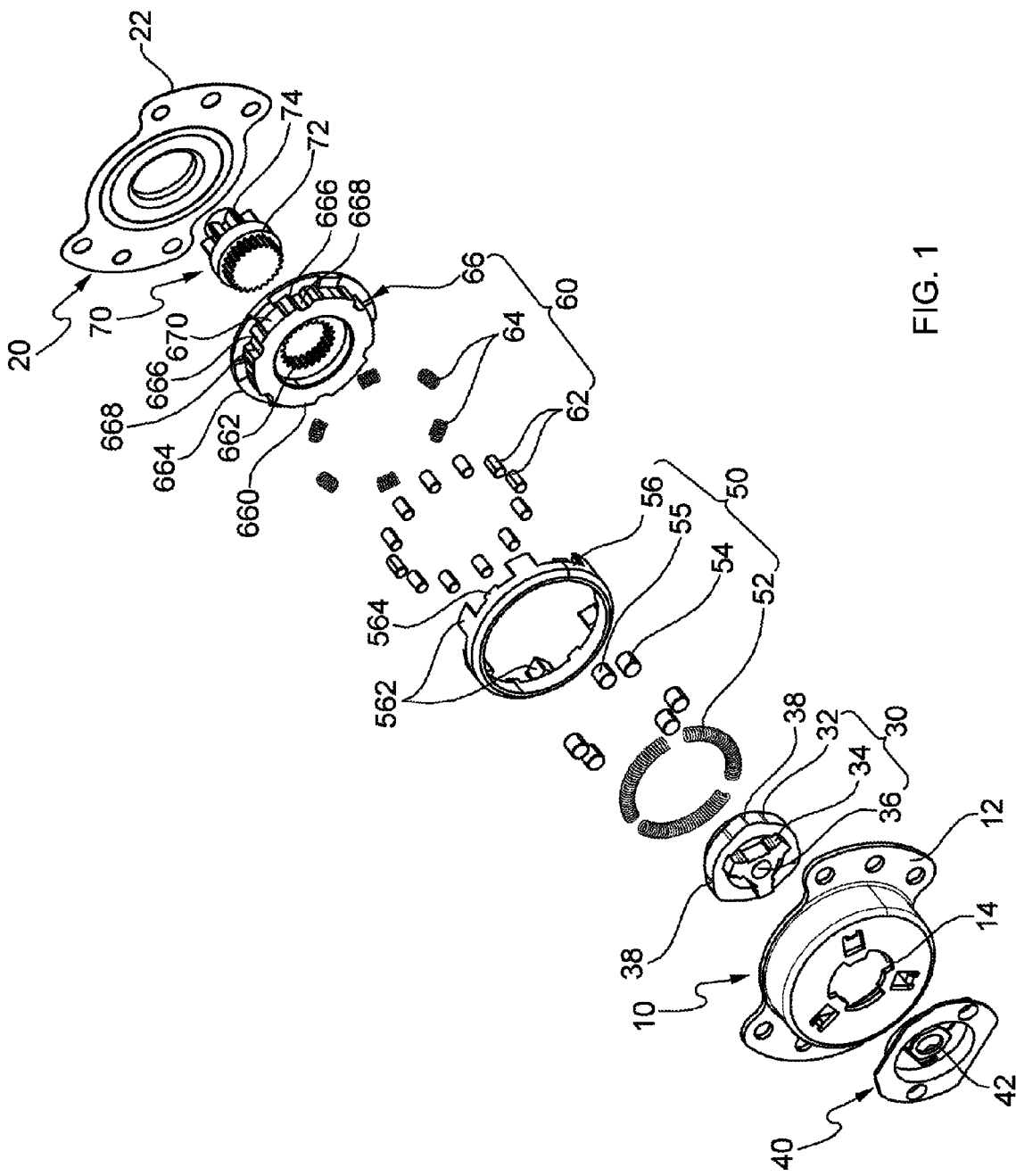
FIG. 1 is an exploded perspective view of a seat pumping device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same constituent elements will be designated by the same reference numerals, if possible, even though they are illustrated in different drawings. Further, in the following description of the present invention, a detailed description of publicly known configurations or functions incorporated herein will be omitted when it is determined that the detailed description may make the subject matter of the present invention unclear. Further, an exemplary embodiment of the present invention will be described below, but the technical spirit of the present invention is not limited thereto and may be modified and variously carried out by those skilled in the art.

Figure 2:
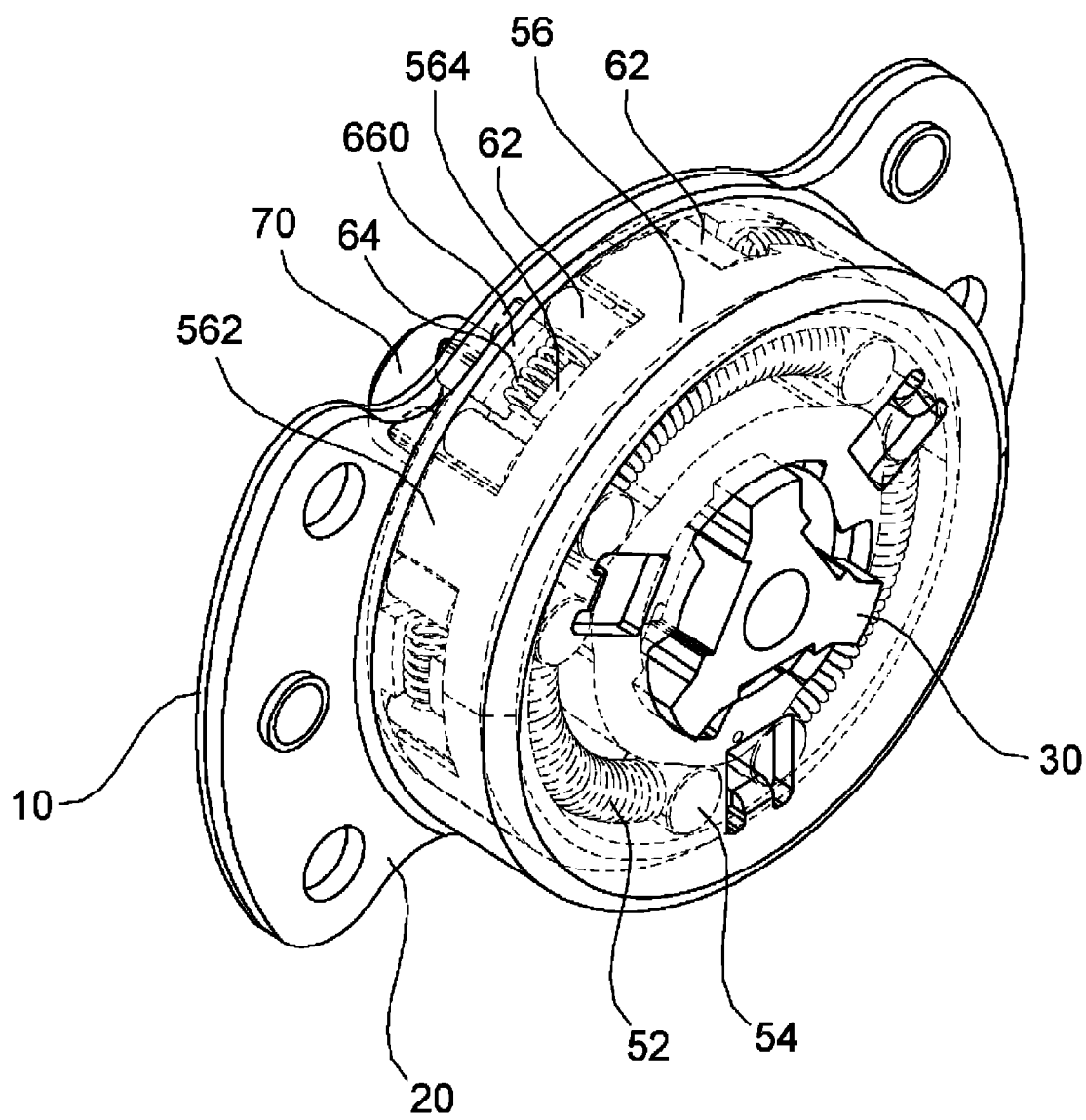
FIG. 2 is a perspective projection view of the seat pumping device for a vehicle according to the exemplary embodiment of the present invention.

FIG. 1 is an exploded perspective view of a seat pumping device for a vehicle according to an exemplary embodiment of the present invention, and FIG. 2 is a perspective projection view of the seat pumping device for a vehicle according to the exemplary embodiment of the present invention.

Referring to FIGS. 1 and 2, the seat pumping device for a vehicle according to the exemplary embodiment of the present invention may include a drum housing 10, a cover plate 20, an input member 30, a lever bracket 40, a clutch device 50, a brake device 60, and an output shaft 70.

The drum housing 10 may have therein an installation space having a predetermined size, and a flange 12, which has a plurality of fastening holes, may be provided at a rim of the drum housing 10.

The cover plate 20 is fastened to the drum housing 10 and serves to cover an opening of the drum housing 10, and a flange 22, which has plurality of fastening holes, is also provided on the cover plate 20, such that the drum housing 10 and the cover plate 20 may be fastened to each other by fastening bolts (not illustrated) or the like fastened to the flanges 12 and 22.

An assembly hole 14 is formed at a central portion of the drum housing 10 so as to penetrate the central portion thereof, such that a part of the input member 30 protrudes through the assembly hole 14 and may be integrally rotatably fastened to the lever bracket 40.

The lever bracket 40 may be integrally rotatably fastened to a lever handle (not illustrated) which may be rotated by a user.

The input member 30 may include a roughly ring-shaped member body 32, and a bridge 34 which protrudes in an axial direction from one surface of the member body 32.

A fastening hole 36 is formed at a central portion of the bridge 34, and the bridge 34 may be integrally rotatably fastened to the lever bracket 40 by fastening bolts or the like through a fastening hole 42 formed in the lever bracket 40. The lever bracket 40 is fitted with the bridge 34 of the input member 30, such that rotational force of the lever bracket 40 may be transmitted to the input member 30.

One or more wedge protrusions 38, which protrude outward in a radial direction, may be formed on the member body 32 at a predetermined interval in a circumferential direction.

In the exemplary embodiment of the present invention, three wedge protrusions 38 may be formed at an angle of 120 degrees in the circumferential direction.

The clutch device 50 may include three clutch springs 52 having a coil spring shape, a clutch drum 56, and three pairs of clutch rollers 54 and 55 which are disposed at an interval of 120 degrees in the circumferential direction, in which each pair includes two clutch rollers 54 and 55.

The clutch drum 56 is formed in a roughly ring shape, and may be provided with one or more manipulation flanges 562 which protrude in the axial direction from one rim of the clutch drum 56.

The one or more manipulation flanges 562 may be formed at a predetermined interval in the circumferential direction, and for example, six manipulation flanges 562 may be formed at an interval of 60 degrees.

Each of the one or more manipulation flanges 562 is formed to protrude more inward in the radial direction than an inner circumferential surface of the clutch drum 56, and in the exemplary embodiment, the manipulation flange 562 may be formed in a triangular block shape. However, as an exemplary embodiment of the present invention, it is acceptable if the manipulation flange 562 protrudes inward from the clutch drum 56, and it is acceptable if a cross section of the manipulation flange 562 has a quadrangular shape or other polygonal shapes instead of the triangular block shape. The manipulation flanges 562 may have various structures such that the manipulation flanges 562 may be positioned in manipulation grooves 668 formed in a brake drum 66 to be described below and may push sidewalls of the manipulation grooves 668.

Support protrusions 564 may be formed between the manipulation flanges 562 of the clutch drum 56. The support protrusions 564 may serve to support positions of brake springs 64. A height of the support protrusion 564 in the axial direction may be smaller than that of the manipulation flange 562.

The brake device 60 may include a plurality of brake rollers 62 which are disposed at a predetermined interval in the circumferential direction, the brake springs 64 which have a coil spring shape and are disposed at a predetermined interval in the circumferential direction, and the brake drum 66.

In the exemplary embodiment of the present invention, twelve brake rollers 62 may be provided, and six brake springs 64 may be provided, such that one of the brake springs 64 may resiliently support the two brake rollers 62 in the circumferential direction.

The brake drum 66 may include a drum body 660 which has a meshing gear 662 formed on an outer circumferential surface of an assembly hole that penetrates a center of the drum body 660, and a flange 664 which is formed at a rim of the drum body 660. As an exemplary embodiment, the flange 664 has a circular outer circumferential surface, and the outer circumferential surface of the flange 664 may be formed to be freely rotated in a state in which the outer circumferential surface of the flange 664 is in contact with an inner circumferential surface of the drum housing 10. With the shape of the flange 664, the brake drum 66 may be rotatable about the same rotation axis in an inner wall surface of the drum housing 10.

One or more wedge surfaces 666, which are cut out in a tangential direction, may be formed on an outer circumferential surface of the drum body 660 at a predetermined interval in the circumferential direction.

In the exemplary embodiment of the present invention, six pairs of wedge surfaces 666 may be formed at a predetermined interval in the circumferential direction.

The brake rollers 62 are disposed at both sides of the wedge surface 666 in the circumferential direction, respectively, and the brake spring 64 is interposed between the two brake roller 62 and serves to push the two brake rollers 62 to both ends of the wedge surface 666. A brake spring seating portion 670, on which the brake spring 64 is positioned, is formed between the pair of wedge surfaces 666.

A manipulation groove 668, which has a roughly "V" shape and is recessed radially inward, is formed between the two wedge surfaces 666 adjacent to each other in the circumferential direction, such that the manipulation flange 562 of the clutch drum 56 may be positioned in the manipulation groove 668.

A circumferential width of the manipulation groove 668 is larger than a circumferential width of the manipulation flange 562, and as a result, when the manipulation flange 562 is positioned in the manipulation groove 668, a gap, which is formed in the circumferential direction, may be formed between the manipulation groove 668 and the manipulation flange 562.

A first pinion gear 72, which meshes with the meshing gear 662 of the brake drum 66, is formed at one end of the output shaft 70 so that the output shaft 70 may be rotated integrally with the brake drum 60, and a second pinion gear 74 is formed at the other end of the output shaft 70 so as to transmit torque to a non-illustrated link mechanism.

Figure 3:
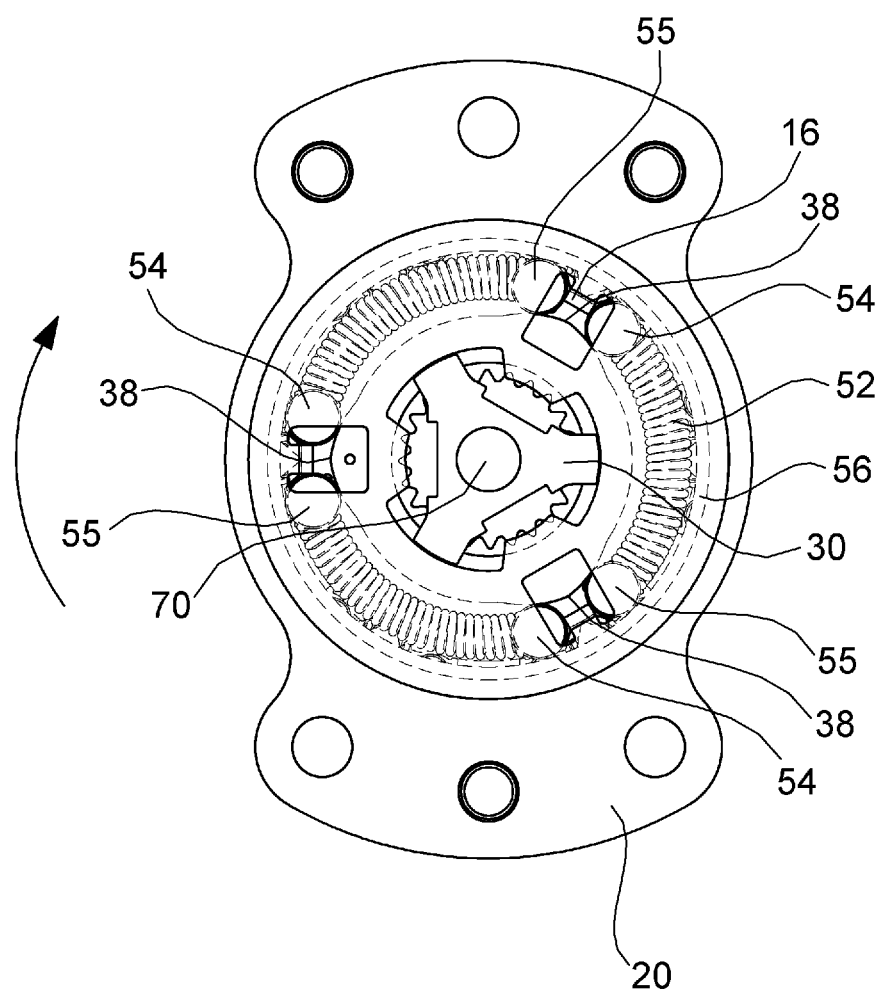
FIG. 3 is a front view of the seat pumping device for a vehicle according to the exemplary embodiment of the present invention.
Figure 4:
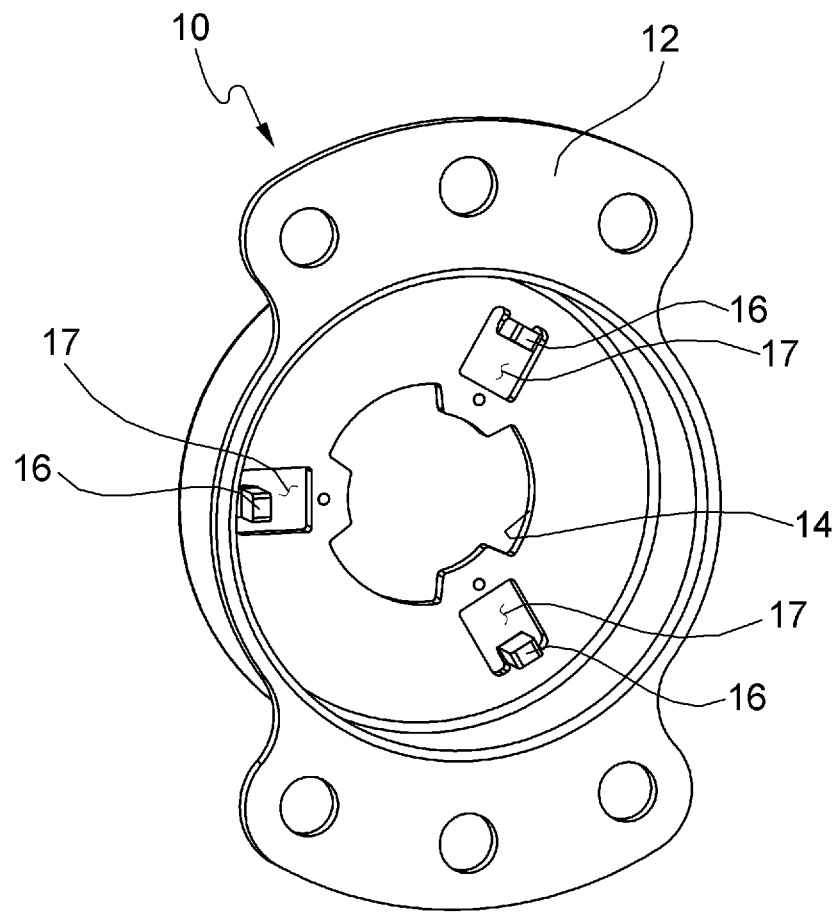
FIG. 4 is a perspective view illustrating a drum housing of the seat pumping device for a vehicle according to the exemplary embodiment of the present invention when viewed from the inside.

FIG. 3 is a front view of the seat pumping device for a vehicle according to the exemplary embodiment of the present invention. Meanwhile, FIG. 4 is a perspective view illustrating the drum housing of the seat pumping device for a vehicle according to the exemplary embodiment of the present invention when viewed from the inside.

A clutch operation of the seat pumping device for a vehicle according to the exemplary embodiment of the present invention will be described below with reference to FIGS. 3 and 4.

Referring to FIG. 3, when an occupant seated in a seat manipulates the lever handle clockwise, for example, in order to increase a height of a seat cushion and match the seat cushion with his/her body type, the input member 30 connected to the lever handle is also rotated clockwise.

When the input member 30 rotates clockwise, the first clutch roller 54, which is positioned clockwise based on the wedge protrusion 38 of the input member 30 (i.e., positioned at the right side of the wedge protrusion 38), is pressed between the wedge protrusion 38 and an inner wall surface of the clutch drum 56. Therefore, the clutch roller 54 creates a wedging action between the clutch drum 56 and the input member 30, thereby rotating the clutch drum 56 clockwise.

Meanwhile, when the first clutch roller 54 is pushed clockwise, the clutch spring 52 is also compressed clockwise, and the second clutch roller 55, which is connected with the first clutch roller 54 through the clutch spring 52, is also pressed clockwise by the clutch spring 52. Because a stopper protrusion 16, which is formed on the inner surface of the drum housing 10, is interposed between the first clutch roller 54 and the second clutch roller 55, the second clutch roller 55 is caught by the stopper protrusion 16 and thus cannot rotate clockwise, but only the clutch spring 52 is compressed. Therefore, the second clutch roller 55 is freely rotated between the input member 30 and the inner wall surface of the clutch drum 56.

As illustrated in FIG. 4, the stopper protrusion 16 protrudes from a front surface of the drum housing 10 in the axial direction. In a case in which the drum housing 10 is formed by a press process, the press process may form the stopper protrusion 16 so that the stopper protrusion 16 protrudes in the axial direction while forming a stopper protrusion forming hole 17 in the front surface of the drum housing 10. In a state in which the input member 30 is not rotated, the stopper protrusion 16 may be positioned at the same radial position as the wedge protrusion 38 of the input member 30.

When the occupant seated in the seat eliminates force applied to the lever handle, compressive restoring force of the clutch spring 52 is applied to the first clutch roller 54, such that the input member 30 returns back to the original position.

The series of operations are performed on the same principle even in a case in which the occupant seated in the seat rotates the lever handle counterclockwise in order to decrease a height of the seat cushion. In this case, the second clutch roller 55 is fixed between the clutch drum 56 and the input member 30, and transmits rotational force.

Figure 5:
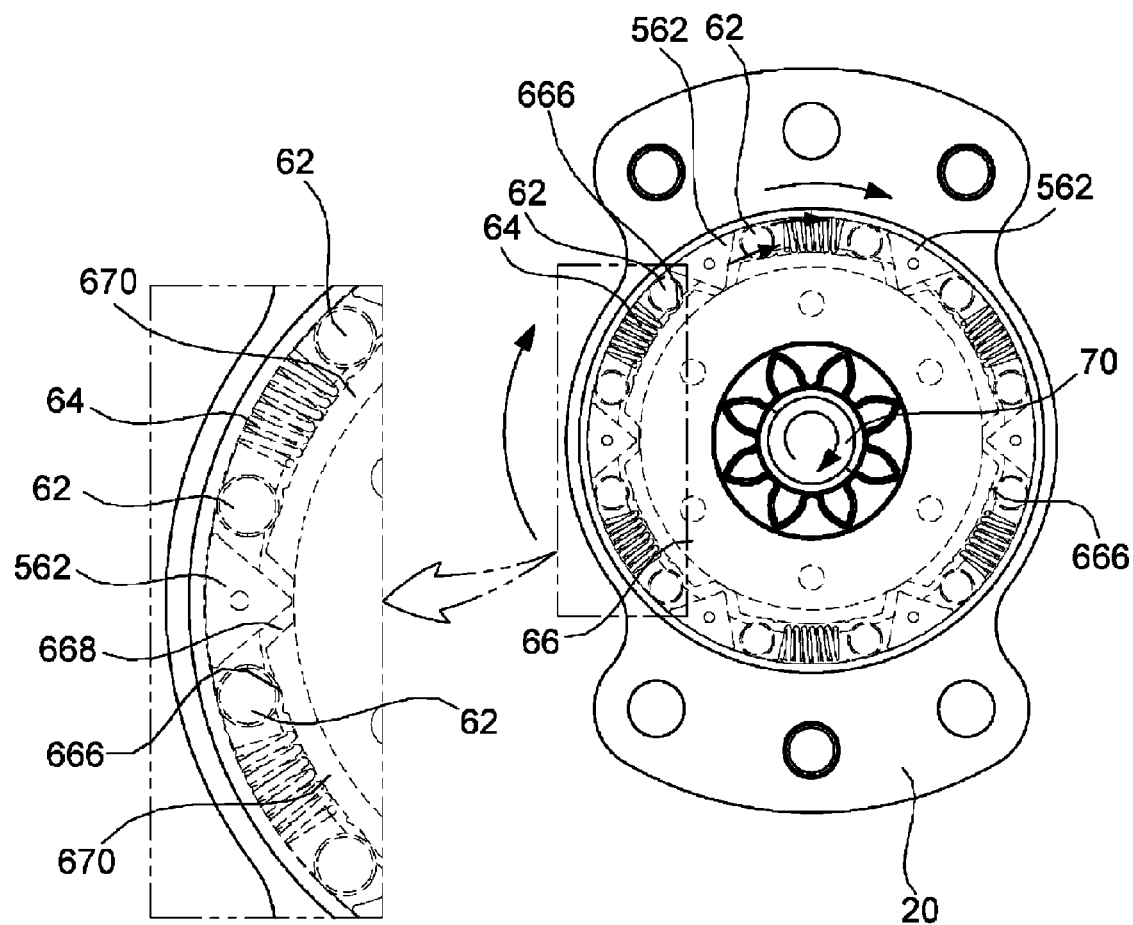
FIG. 5 is a rear view of the seat pumping device for a vehicle according to the exemplary embodiment of the present invention.

FIG. 5 is a rear view of the seat pumping device for a vehicle according to the exemplary embodiment of the present invention. A brake operation and a release operation of the seat pumping device for a vehicle according to the exemplary embodiment of the present invention will be described with reference to FIG. 5. However, in order to explain the brake operation, the flange 664 of the brake drum 66 is omitted from FIG. 5.

Referring to FIG. 5, when the clutch drum 56 rotates clockwise, the manipulation flange 562 of the clutch drum 56 pushes the adjacent brake roller 62, such that the brake roller 62 moves toward a center of the wedge surface 666, and as a result, a clockwise rotation brake function of the brake drum 66 is released. In this state, when the clutch drum 56 is continuously rotated, the manipulation flange 562 of the clutch drum 56 comes into contact with the sidewall of the manipulation groove 668 of the brake drum 66, thereby rotating the brake drum 66 clockwise.

That is, some of the manipulation flanges 562 are inserted into the manipulation grooves 668 and spaced apart from wall surfaces of the manipulation grooves 668, and in this state, the clutch drum 56 is rotated, such that the manipulation flanges 562 push the brake rollers 62 from the wedge surfaces 666. Thereafter, the manipulation flanges 562 come into contact with the wall surfaces of the manipulation grooves 668 of the brake drum 66, respectively, thereby rotating the brake drum 66.

When the brake drum 66 rotates, the output shaft 70, which meshes with the brake drum 66, also rotates integrally with the brake drum 66 so as to transmit torque to the link mechanism, thereby adjusting a height of the seat cushion so that the height of the seat cushion is increased.

On the contrary, the same action is created in a case in which a height of the seat cushion is decreased by rotating the clutch drum 56 counterclockwise and also rotating the brake drum 66 counterclockwise.

Meanwhile, in a case in which no manipulation force is inputted, through the clutch drum 56, to the seat cushion of which the height is adjusted as described above, the brake rollers 62, which are positioned on the wedge surfaces 666 of the brake drum 66, are pushed by the brake springs 64 toward both wedge surfaces 666 of the brake spring seating portion 670. Therefore, even though external force is inputted through the output shaft 70, the rotation of the brake drum 66 is prevented.

That is, the brake roller 62 creates a wedging action between the wedge surface 666 of the brake drum 66 and the inner circumferential surface of the drum housing 10, and as a result, the brake drum 66 cannot be rotated clockwise or counterclockwise even though external force is inputted through the output shaft 70, such that the adjusted height of the seat cushion may be maintained as it is.

That is, if a wedge function of the brake rollers 62 is not released first, the brake drum 66 cannot be rotated clockwise or counterclockwise by the brake rollers 62, thereby preventing the seat cushion from being arbitrarily moved upward and downward by external force.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A seat pumping device for a vehicle, the seat pumping device comprising:
   a clutch device which is rotated clockwise or counterclockwise by receiving external manipulation force, and has one or more manipulation flanges formed in a block shape that are disposed at a predetermined interval in a circumferential direction and protrude in an axial direction; and
   a brake device which has one or more manipulation grooves in which the manipulation flanges are accommodated to come into contact with the manipulation grooves clockwise or counterclockwise so that the brake device is rotated clockwise or counterclockwise by receiving the external manipulation force from the clutch device, and performs a brake function such that the brake device is not rotated clockwise and counterclockwise by the external manipulation force that is not through the clutch device;
   wherein the brake device comprises a brake drum and a plurality of brake rollers being interposed between wedge surfaces of the brake drum and an inner circumferential surface of a drum housing, and disposed at a predetermined interval in the circumferential direction;
   wherein when the clutch device rotates, a manipulation flange releases a brake state by pushing a brake roller first, and then transmits rotational force to the brake drum by pushing one side wall surface of a manipulation groove.

2. The seat pumping device of claim 1, wherein the clutch device includes a ring-shaped clutch drum, and the manipulation flange is formed to protrude in the axial direction from one rim of a body of the clutch drum.

3. The seat pumping device of claim 2, wherein the manipulation flange is formed to protrude further inward in a radial direction than an inner circumferential surface of the clutch drum.

4. The seat pumping device of claim 2, wherein the brake drum includes:
   a drum body having an assembly hole that penetrates a center of the drum body so that an output shaft is coupled to the assembly hole; and
   a flange formed at one side of the drum body, and the manipulation grooves are disposed in an outer circumferential surface of the drum body at a predetermined interval in the circumferential direction.

5. The seat pumping device of claim 4, wherein wedge surfaces are formed at both sides of the manipulation groove of the drum body.

6. The seat pumping device of claim 5, wherein the manipulation groove is formed to be recessed inward in the radial direction from the outer circumferential surface.

7. The seat pumping device of claim 4, wherein a circumferential width of the manipulation groove is larger than a circumferential width of the manipulation flange.

8. The seat pumping device of claim 4, wherein the flange is formed to have a circular outer circumferential surface, and the flange is rotatable by being supported on the inner circumferential surface of the drum housing that accommodates the clutch device and the brake device.

9. The seat pumping device of claim 4, wherein an input member is accommodated in the clutch drum so as to be rotatable by the external manipulation force,
   wherein a plurality of clutch rollers is disposed between an outer circumferential surface of the input member and the inner circumferential surface of the clutch drum, and
   wherein two clutch rollers are resiliently supported in the circumferential direction by clutch springs, and the clutch drum rotates together with the input member by an wedging action of the clutch rollers by the rotation of the input member.

10. The seat pumping device of claim 9, wherein the input member includes a member body, and one or more wedge protrusions, which protrude outward in the radial direction and create the wedging action by pressing the clutch rollers, are formed on the member body.

11. The seat pumping device of claim 10, wherein the one or more wedge protrusions are disposed at a predetermined interval in the circumferential direction.

12. The seat pumping device of claim 9, wherein a stopper protrusion, which restricts a movement of the clutch roller that does not perform the wedging action, is formed on the drum housing.

13. The seat pumping device of claim 10, further comprising: a lever bracket which is coupled to a lever handle manipulated clockwise and counterclockwise by an occupant seated in a seat, and rotates together with the lever handle, wherein the lever bracket is fastened to the input member so as to be rotated integrally with the input member.

14. The seat pumping device of claim 9, further comprising:
   a drum housing which accommodates the clutch device and the brake device so that the clutch device and the brake device are rotatable; and
   a cover plate which is fastened to the drum housing so as to block and cover an opening of the drum housing,
   wherein the brake device includes brake springs which are interposed between the plurality of brake rollers adjacent to each other, and resiliently support the plurality of brake rollers in the circumferential direction.

* * * * *